Oct. 14, 1952 N. E. MARINER ET AL 2,613,377
MACHINE FOR USE IN MAKING INSOLES
Filed Nov. 3, 1948 13 Sheets-Sheet 7
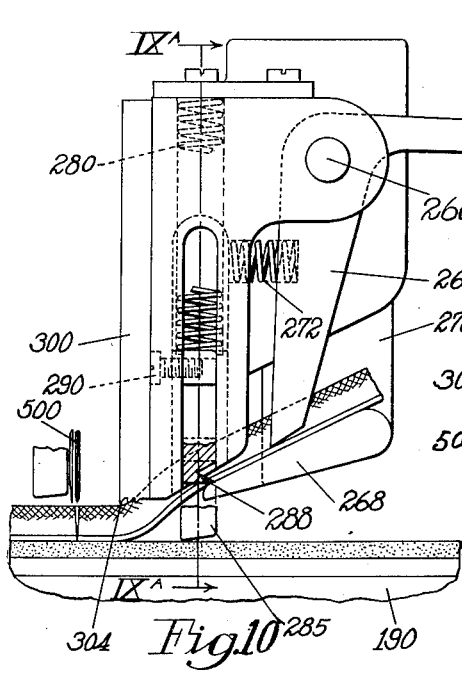
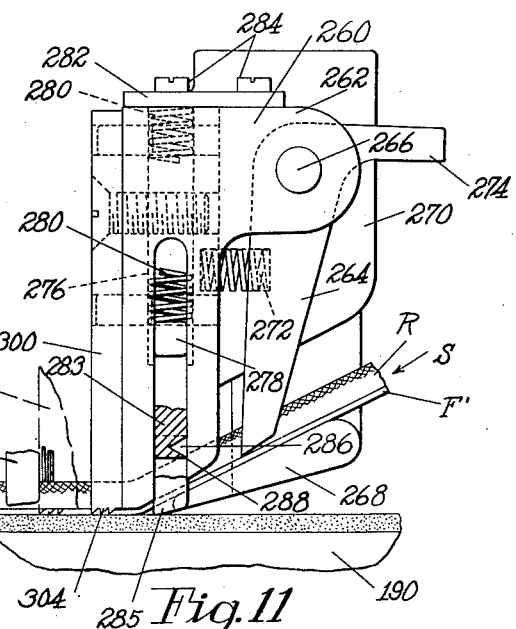
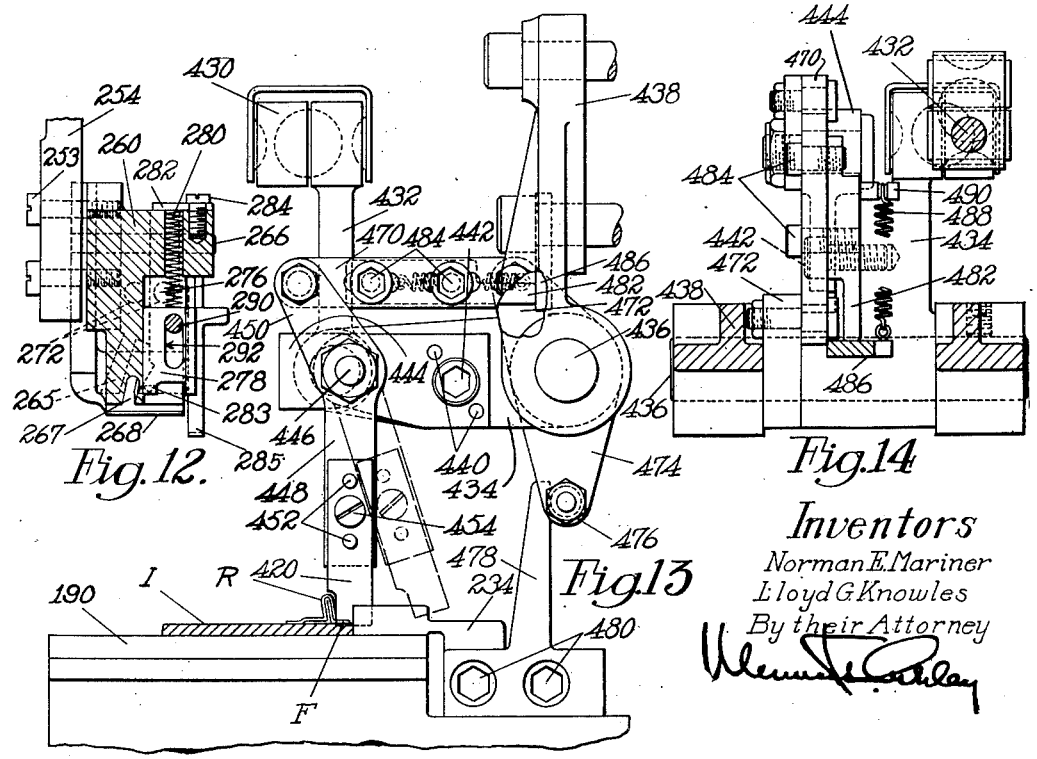
Inventors
Norman E. Mariner
Lloyd G. Knowles
By their Attorney

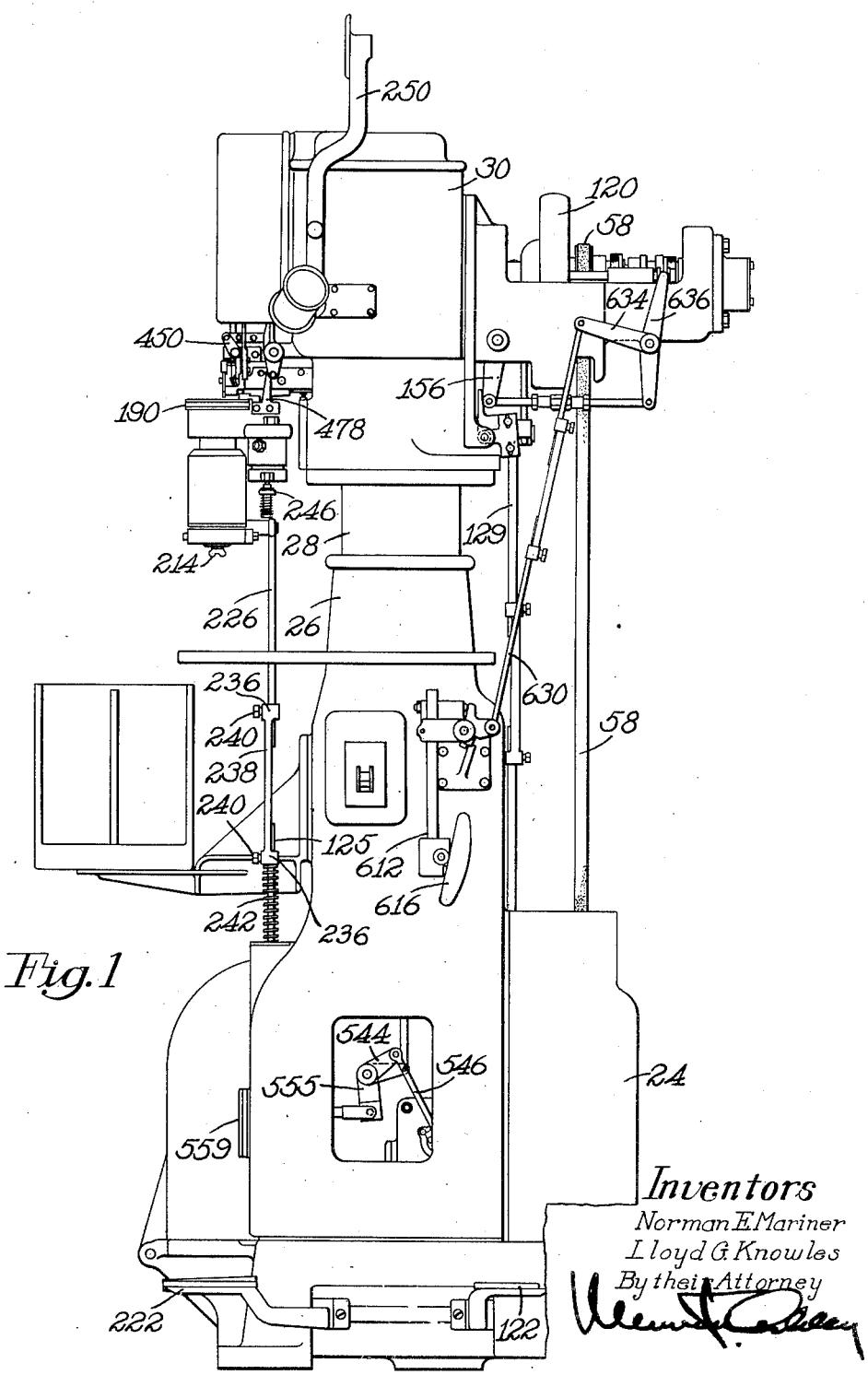

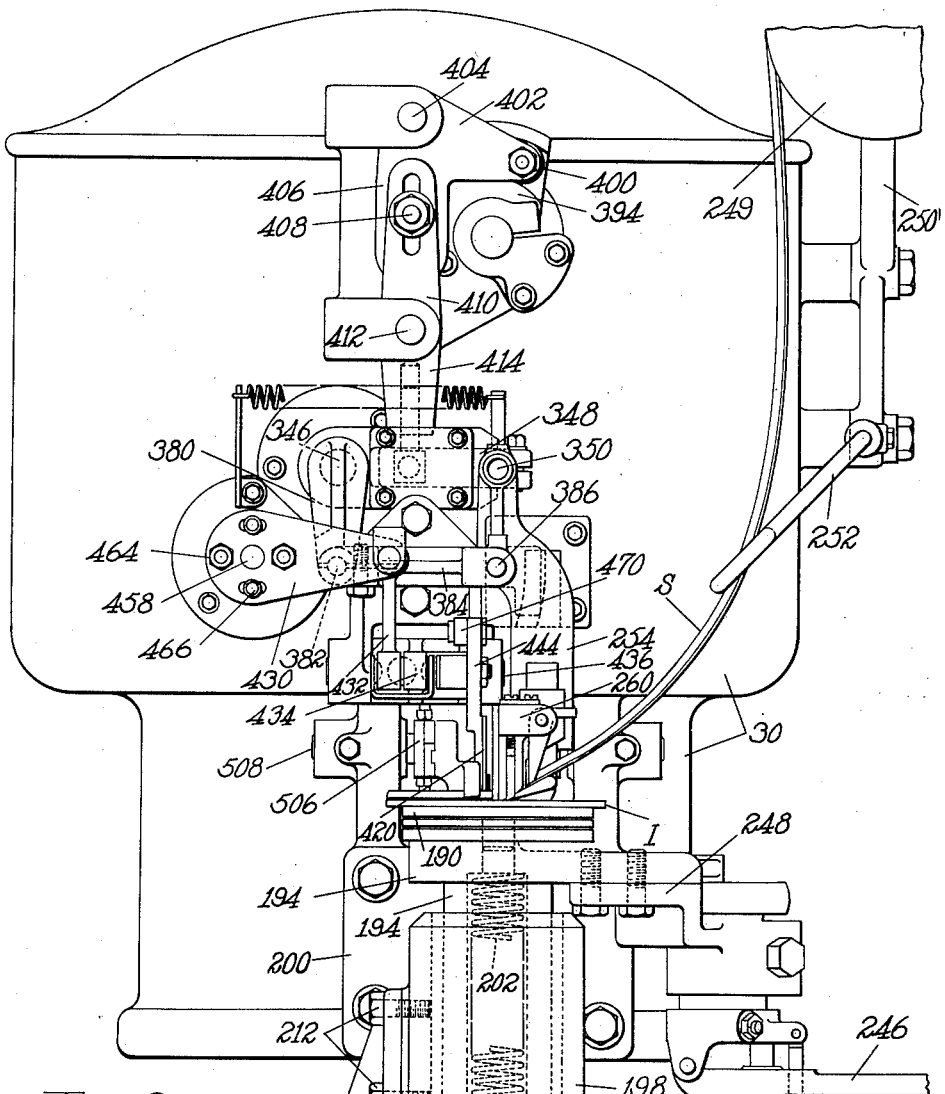

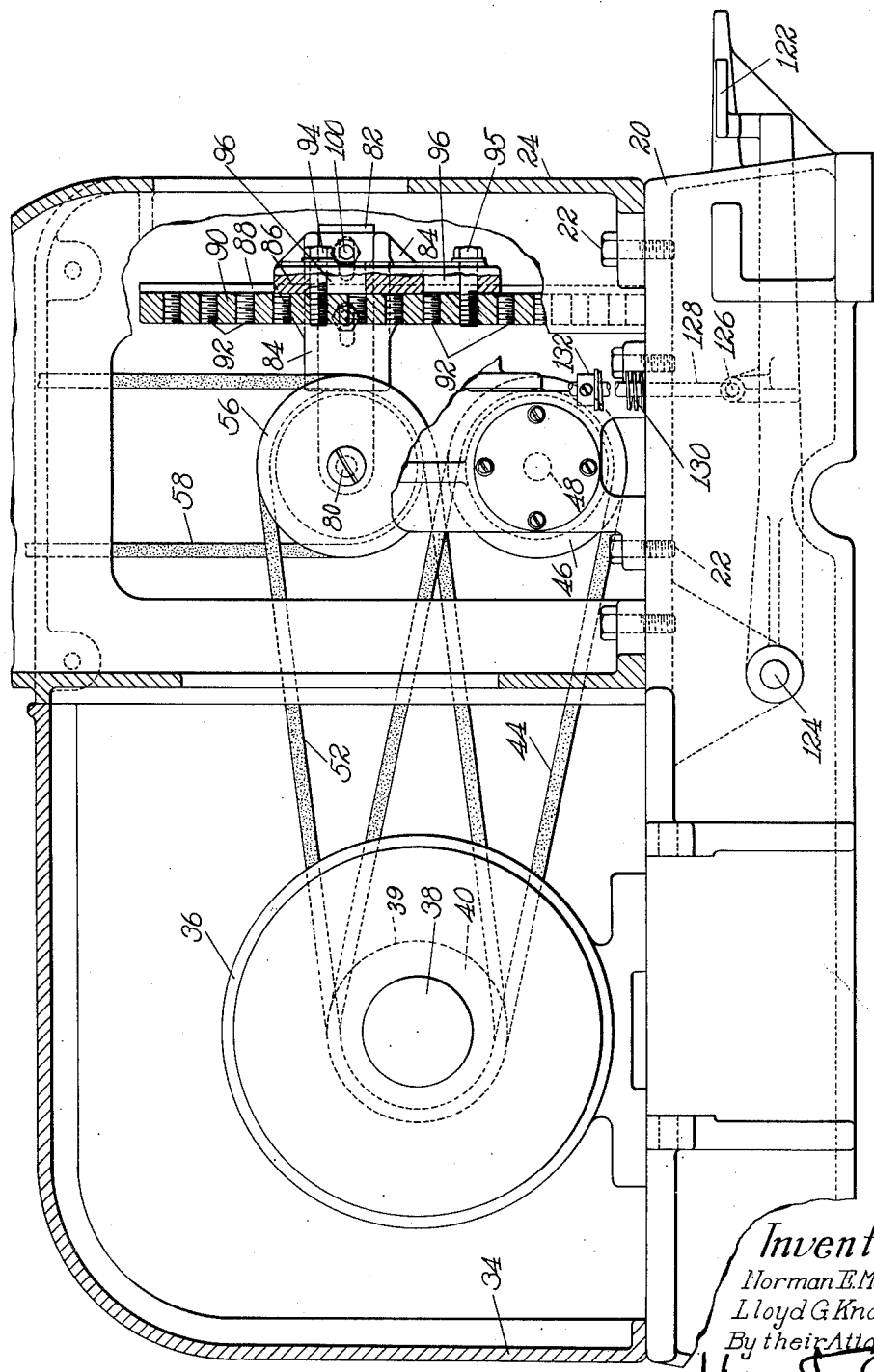

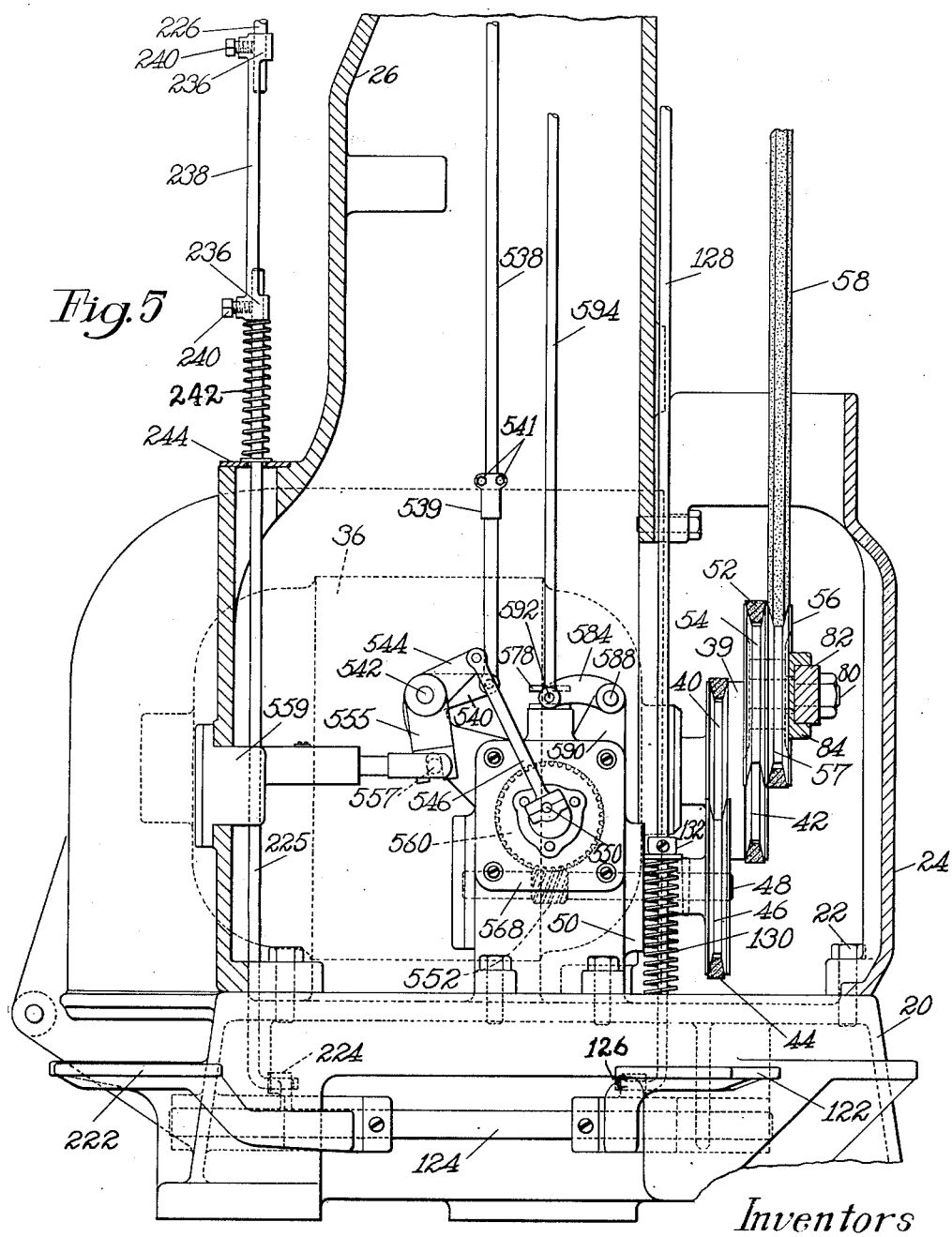

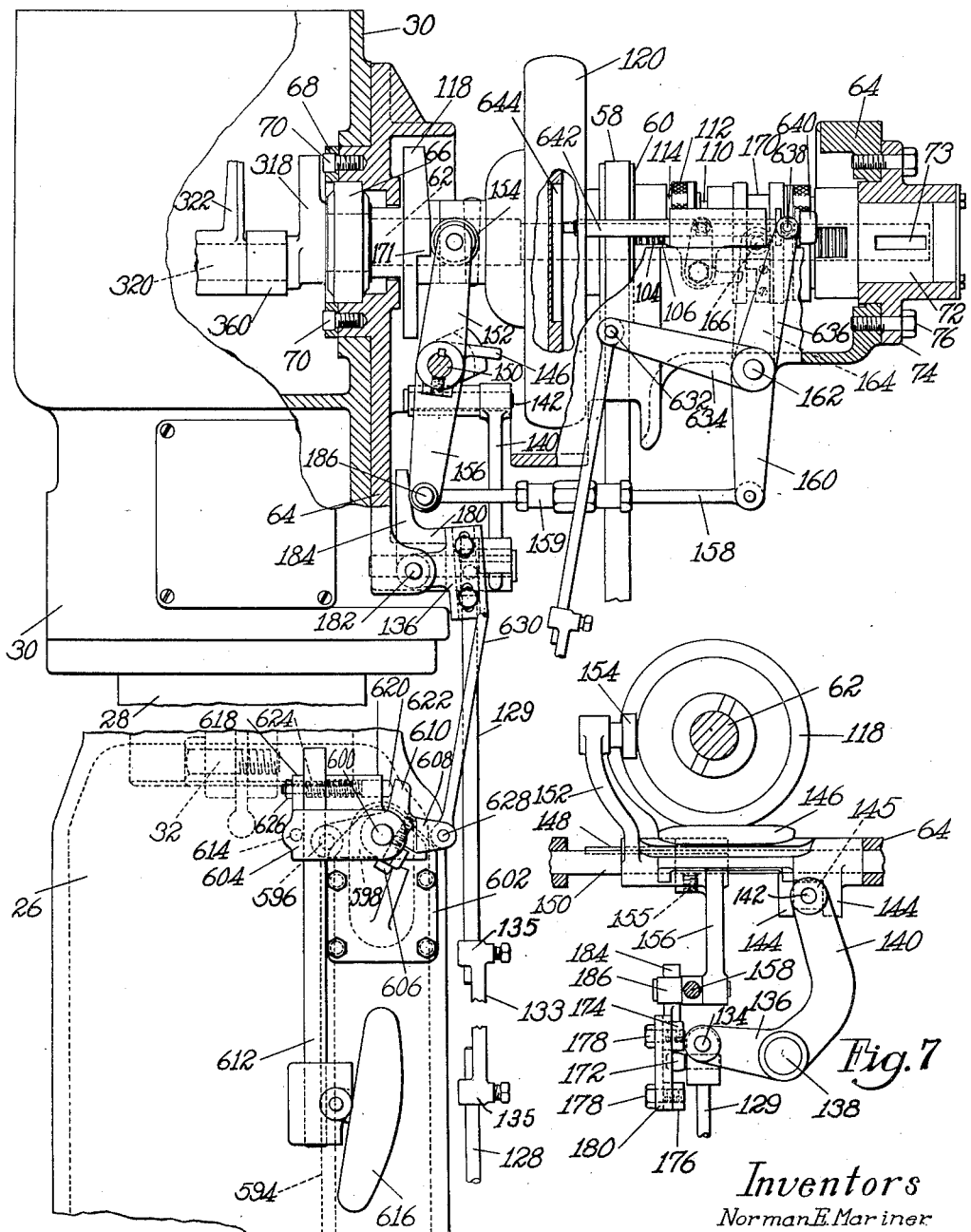
Fig. 6  Fig. 7
Inventors
Norman E. Mariner
Lloyd G. Knowles
By their Attorney

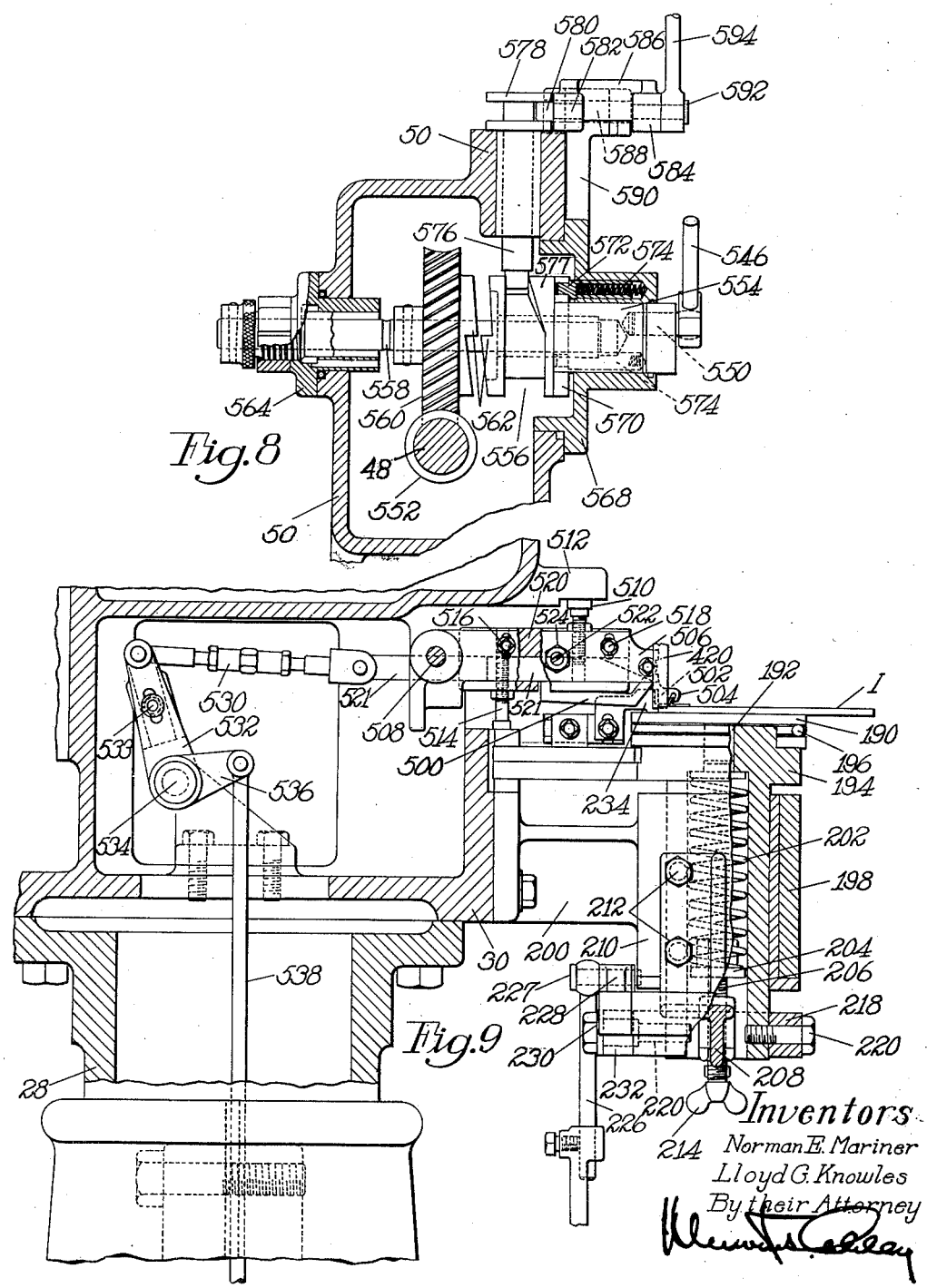

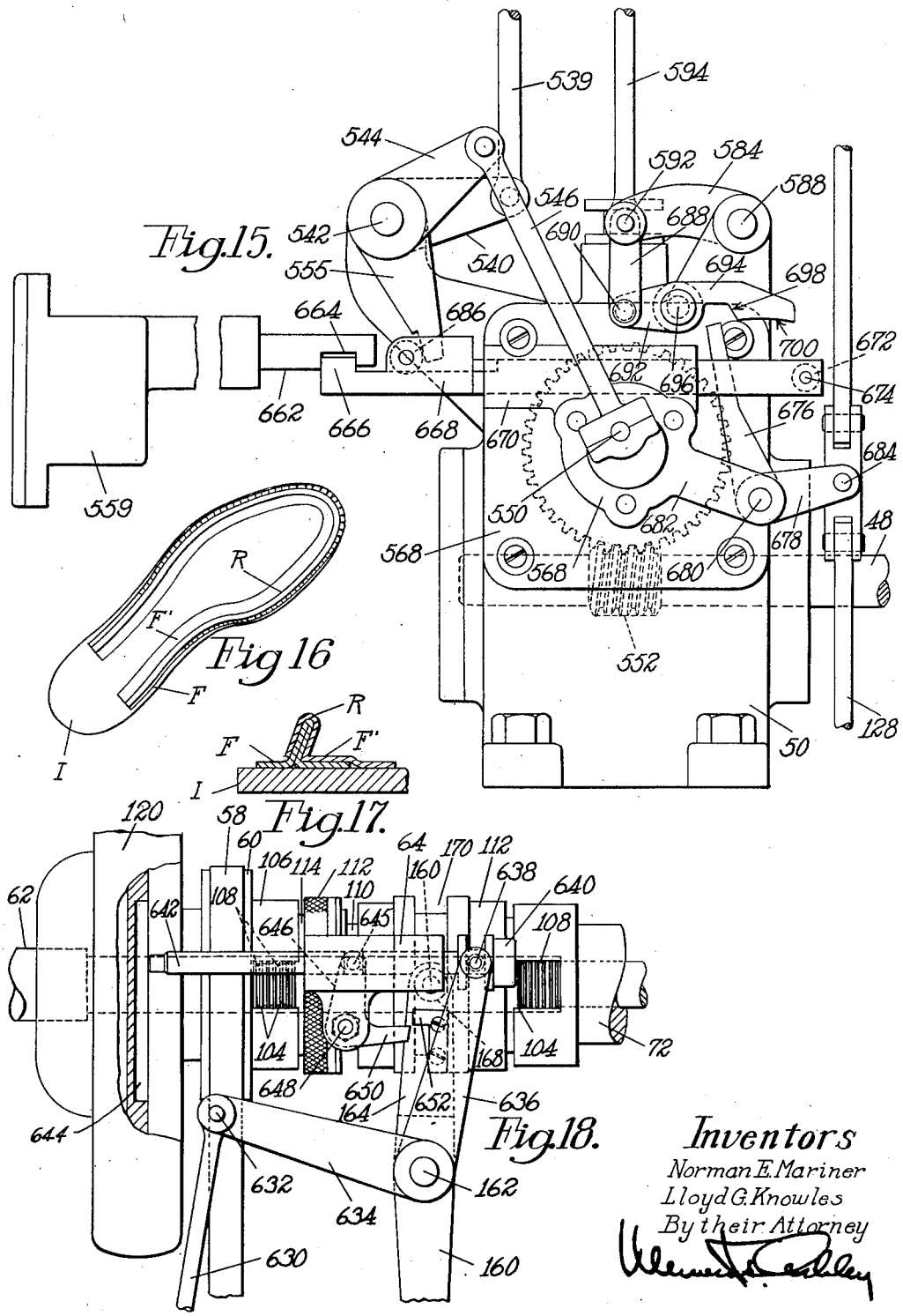

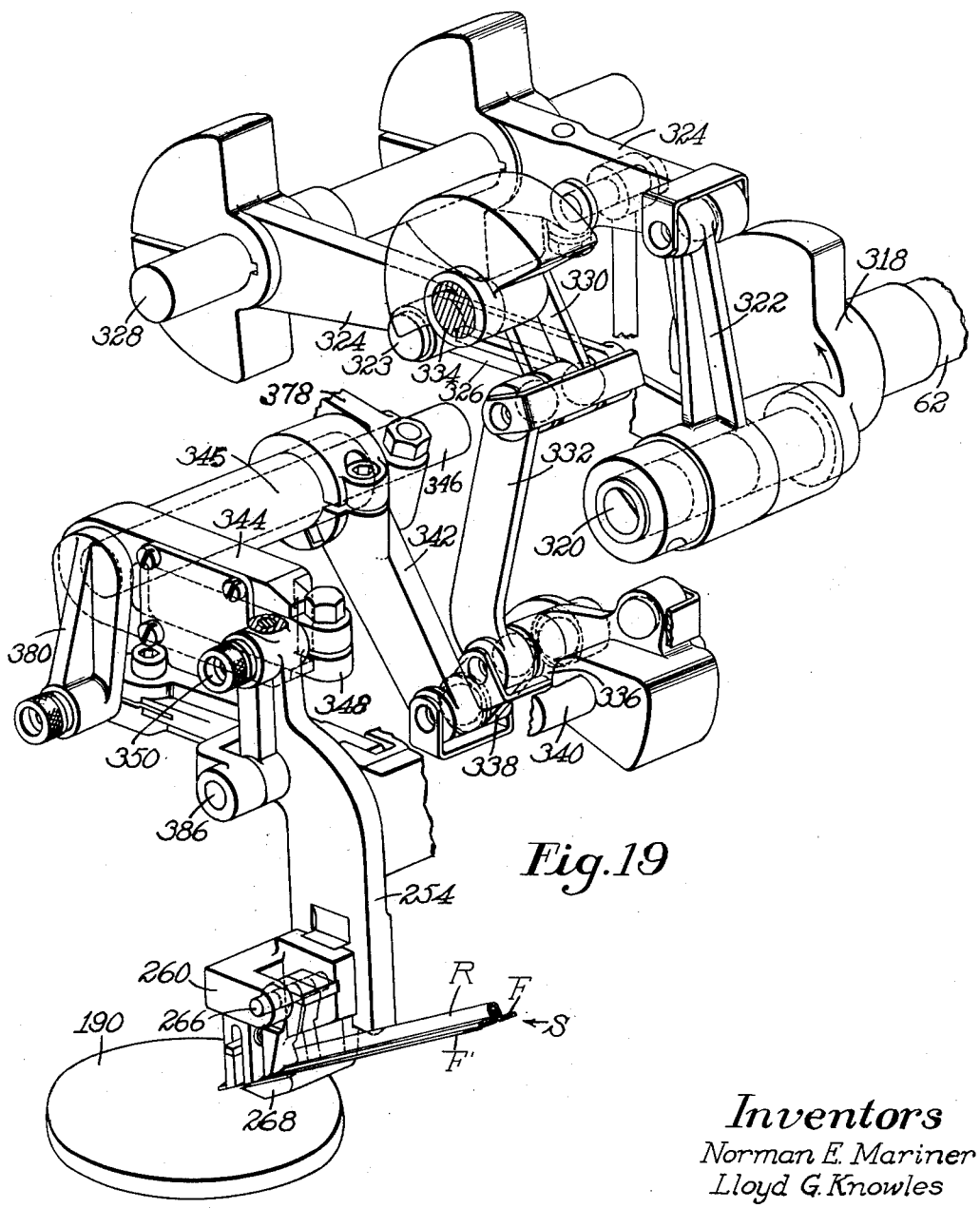

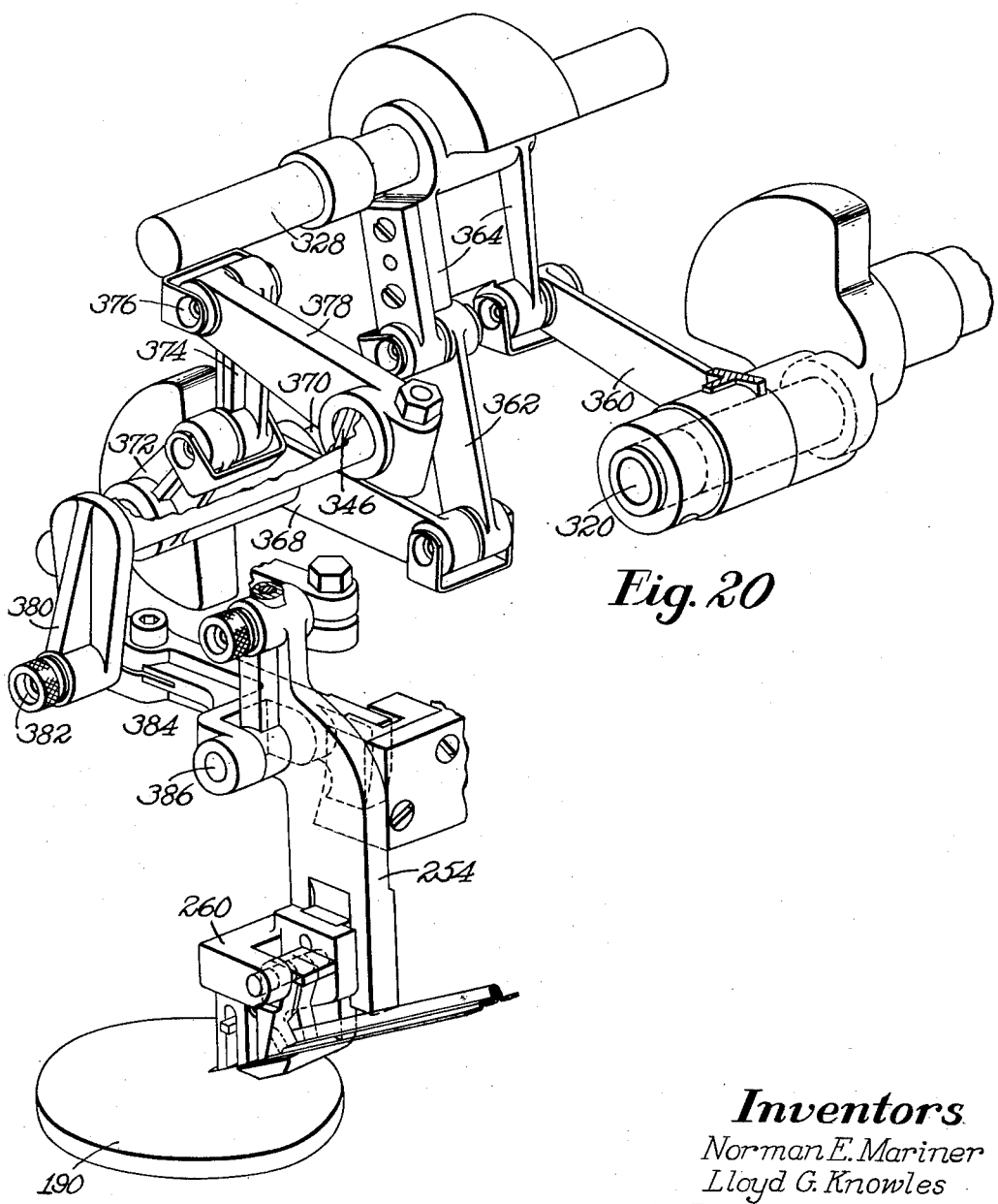

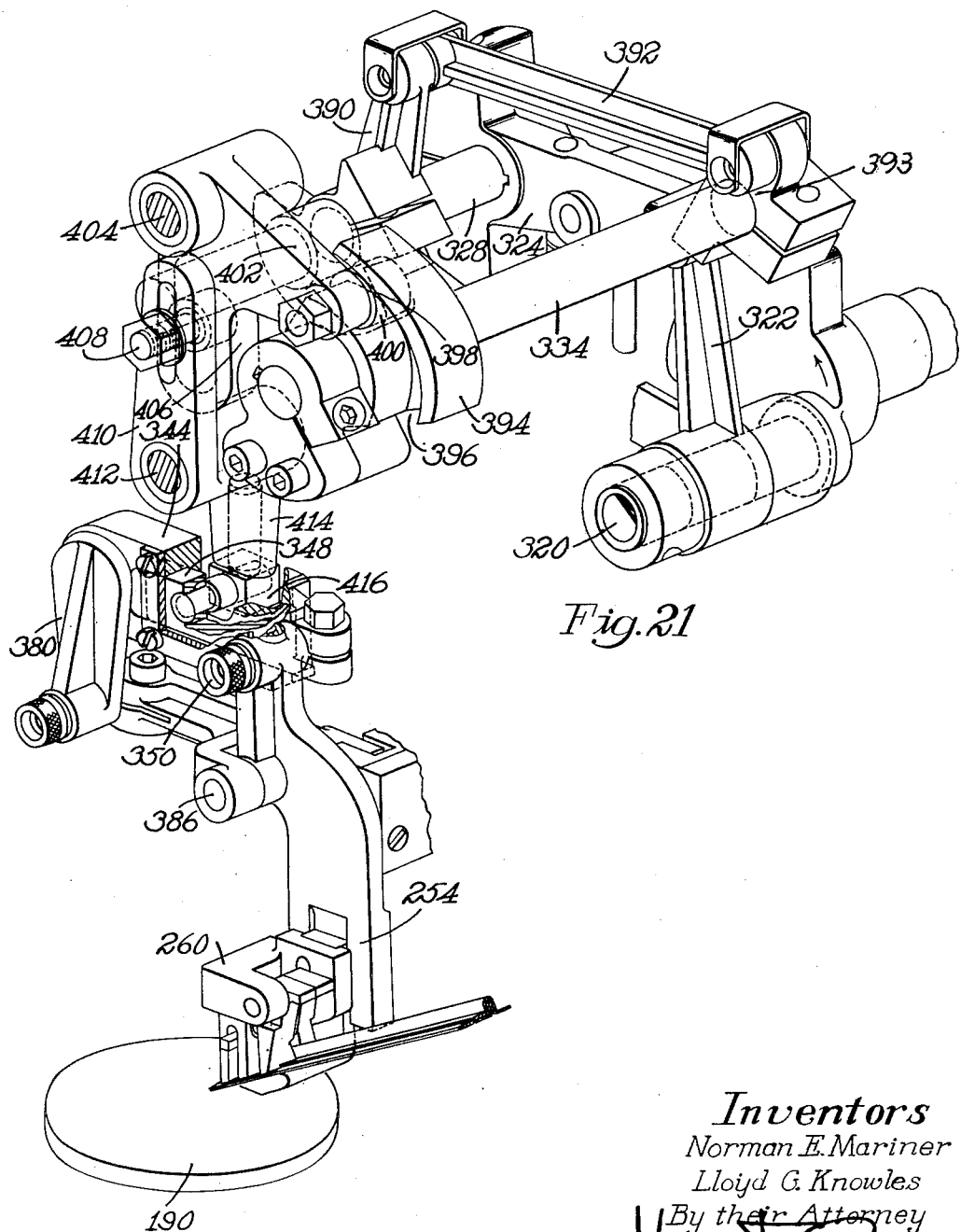

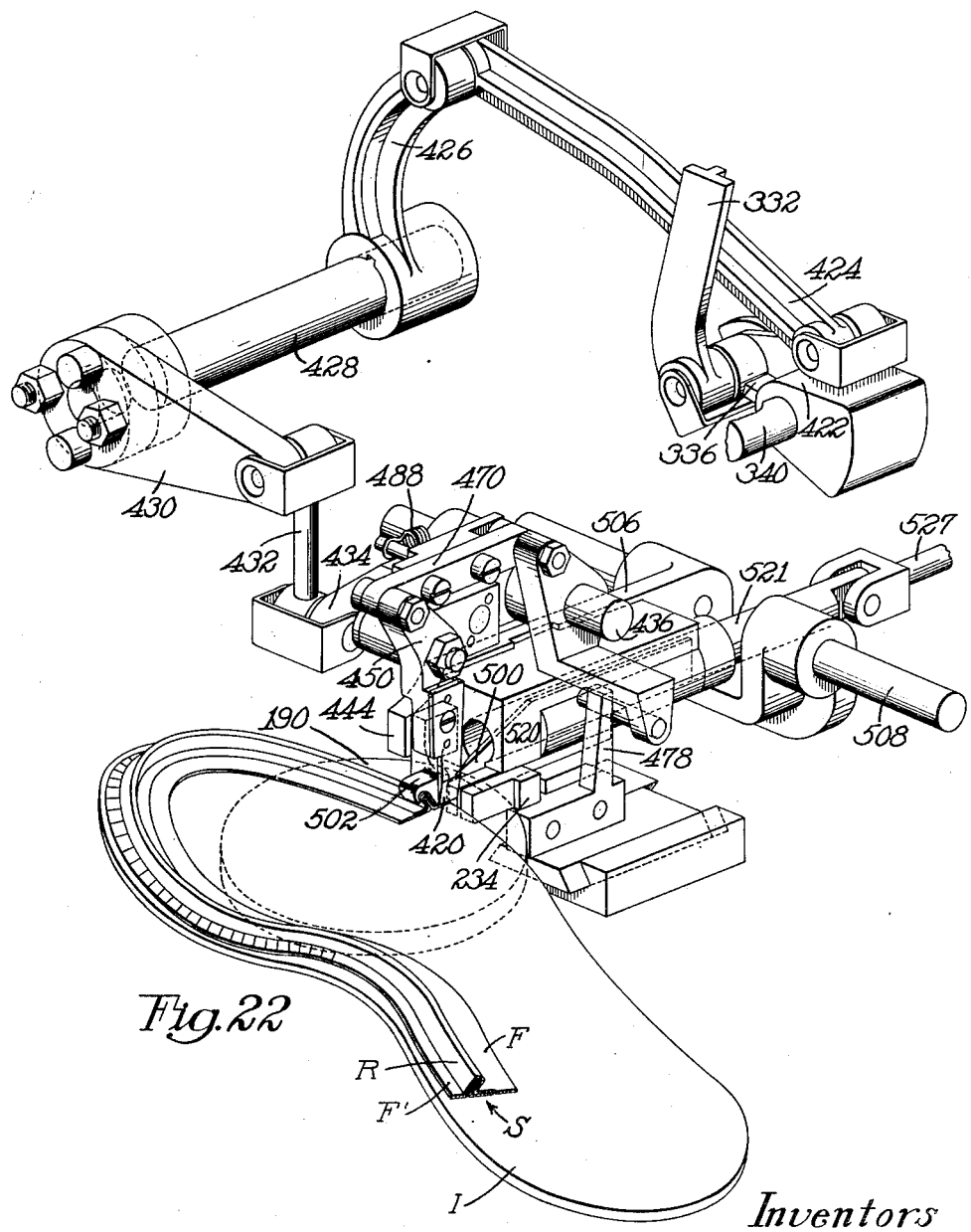

Inventors
Norman E. Mariner
Lloyd G. Knowles
By their Attorney

Patented Oct. 14, 1952

2,613,377

UNITED STATES PATENT OFFICE 2,613,377

MACHINE FOR USE IN MAKING INSOLES

Norman E. Mariner, Beverly, and Lloyd G. Knowles, Hamilton, Mass., assignors to United Shoe Machinery Corporation, Flemington, N. J., a corporation of New Jersey Application November 3, 1948, Serial No. 58,082

27 Claims. (Cl. 12—20)

This invention relates to machines for operating on soles for shoes and is particularly adapted, as illustrated, for applying ribbed strips to insoles to form sewing ribs thereon.

Objects of the invention are to improve, perfect and simplify machines for this work of the type disclosed in application for Letters Patent of the United States Serial No. 784,344, which has matured into Patent No. 2,573,683, granted November 6, 1951, filed November 6, 1947, in the name of Frederic E. Bertrand, and in Letters Patent of the United States No. 2,326,119, granted August 10, 1943, in the name of Frederic E. Bertrand.

As a feature of the invention, the feed foot of the machine comprises not only a guide for the ribbed strip with feed pawls for advancing it, but also means for pressing portions of the strip on each side of the rib upon the insole to cause it to adhere thereto, thus eliminating other means for pressing the flanges upon the insole. Furthermore, the pressing means is also utilized to feed the work.

Another feature of the invention consists in means for holding the strip from pulling through the guide when the insole is removed from the machine. The machine is provided with a knife for severing the strip at a point just beyond a portion of the strip which has been acted upon by the pressing means of the strip guide which attaches the strip to the insole. After the strip has been severed by the knife, a small area of the strip adheres to the insole, causing removal of the insole to tend to pull the strip through the guide. This interferes with the proper starting of the strip upon the next insole. Accordingly, there is mounted in the strip guide a vertically movable and downwardly extending spring-pressed dog having a tooth to engage a portion of the strip in the guide, the tooth, when permitted to act, holding the strip from pulling through the guide and enabling the insole to be pulled loose from the small area of adhesion to the strip. During application of the strip to the insole, the dog is held out of contact with the strip by upward pressure of the work support so that its tooth does not engage the strip. When the work support is lowered for removal of the insole, the dog engages the strip, permitting the insole to be removed without disturbance of the strip the end portion of which thus remains under the pressing means on the feed foot in position to be stuck to the next insole presented to the machine, the tooth being released as the work support rises to normal operating position.

As in the machine of the prior Patent No. 2,573,683, one clutch is provided for controlling the operation of the strip-laying mechanism and another clutch for controlling the operation of the cut-off knife. As a feature of this invention, mechanism is provided to render the clutches mutually exclusive, that is, mechanism whereby when either clutch is operating the other clutch cannot be operated. As illustrated, the strip-laying mechanism is operated through a clutch action of which is controlled by means of a treadle, depression of which sets the clutch to operate the strip-laying mechanism, and the cut-off knife is operated through a clutch under control of a knee lever. When the knee lever is operated, a stop is thrown in the path of parts moved by the treadle and when the treadle is depressed to operate the applying mechanism a stop is thrown in the way of the knife-clutch tripping mechanism to prevent its effective operation.

The clutch of the applying mechanism is provided with a brake and means to apply the brake to stop the machine in that portion of its cycle in which it is safe to operate the cut-off knife, and with means to prevent setting of the clutch for operating the cut-off knife unless the applying mechanism is so stopped. This construction, with the stops above mentioned, renders it impossible to operate the machine except as intended. That is, if the applying mechanism is stopped in that portion of its cycle when the feed foot is out of the path of the cut-off knife, the knife can be operated and when the applying mechanism is in operation the cut-off knife cannot be operated; neither can the applying mechanism be operated while the clutch for operating the cut-off knife is operating. Thus, safety to the machine as well as to the operator is insured.

The machine, as illustrated, may be provided with an indicator or counter mechanism arranged to be operated when the cut-off knife is operated, and a modified construction is illustrated whereby the cut-off knife may be operated a number of times during the stop of the applying mechanism, the first operation only moving the plunger of the counter in one direction and depression of the treadle to operate the applying mechanism moving the plunger back to its initial position. Also, depression of the treadle moves the stop into the path of the knife-clutch-tripping mechanism to prevent its operation, and operation of the knife-clutch-tripping mechanism locates a stop in the path of means operated by the treadle to prevent depression thereof.

Under some conditions it is desirable to slit the outer flange of the ribbed strip to prevent "strapping" or distortion of the insole. For this purpose a slitting knife with an edge parallel to the plane of the insole is mounted for vertical reciprocation by power of the machine and is so mounted that it may be moved substantially parallel to its edge away from the insole to render it inoperative while its reciprocation continues. The machine has the usual edge gage provided in machines of this type which is shifted by the operator during operation of the machine to locate the applied rib nearer to or farther from the edge of the insole. In the illustrated machine, movement of the edge gage to locate the rib farther from the edge of the insole, as in the shank portion, is utilized to move the slitting knife to its inoperative position and, when the gage is moved to position the rib nearer the edge of the insole, the slitting knife is restored to operative position, an adjustable stop determining the operative position of the knife with respect to the rib.

As usual in machines of this type, the head has a neck arranged for vertical adjustment to suit operators of different heights or to enable an operator to tend the machine either in a sitting or a standing position. Also, as usual, the main shaft in the head of the machine is driven from a countershaft in its base belted to the main shaft. Under such conditions, when the head is adjusted the length of the belt from the countershaft to the main shaft must be changed. This is particularly undesirable when an integral endless belt is employed. Accordingly, means is provided whereby the countershaft may be adjusted vertically or horizontally to compensate for varied vertical positions of the head. As illustrated, a double pulley, to which a motor in the base is belted, is mounted on a shaft secured to a horizontal slide and said slide is mounted in a member guided for vertical movement on a vertical surface on a vertical strut forming part of the base, said member having two vertically extending slots and said strut having a series of threaded holes so spaced that two of the holes are accessible through each of said slots. A screw is passed through each of the slots in one of the threaded holes. By selecting the proper one of the two holes accessible in each of the slots, the member carrying the pulley may be moved vertically up or down while the block is held by at least one screw in guiding relation to the strut. The tension of the motor belt may be adjusted and maintained by moving the horizontal slide.

These and other features of the invention will appear more fully from the following description when read in connection with the accompanying drawings and will be pointed out in the appended claims.

In the drawings,

Fig. 1 is a side elevation of the machine;

Fig. 2 is a front elevation of the head of the machine;

Fig. 3 is a detail, partly in section, of parts shown in Fig. 2;

Fig. 4 is an elevation, partly in section, of the base of the machine;

Fig. 5 is an elevation at right angles to Fig. 4 of the base and part of the column, the base and column being in section;

Fig. 6 is an elevation, partly in section, of the upper part of the column and the rear portion of the head;

Fig. 7 is a detail, partly in section, of parts shown in Fig. 6;

Fig. 8 is a detail, partly in section, of the clutch for operating the cut-off knife;

Fig. 9 is an elevation, partly in section, of the table and cutting-off knife operating means;

Fig. 10 is an elevation, partly in section, of the feed foot and adjacent parts, the table being lowered;

Fig. 11 is a view similar to Fig. 10, the table being raised;

Fig. 12 is a sectional detail of parts shown in Fig. 11;

Fig. 13 is an elevation of the mechanism for operating the slitting knife;

Fig. 14 is a plan view, partly in section, of the parts shown in Fig. 13;

Fig. 15 is an elevation of parts shown in Fig. 5 in modified form;

Fig. 16 is a plan view of an insole after operation thereon by the machine;

Fig. 17 is an enlarged sectional detail of the insole;

Fig. 18 is an enlarged elevation of parts shown in Fig. 6;

Fig. 19 is a perspective view of mechanism for imparting heightwise movement to the feed foot;

Fig. 20 is a perspective view of mechanism for imparting horizontal movements to the feed foot;

Fig. 21 is a perspective view of mechanism for imparting over-feed movements to the feed foot;

Fig. 22 is a perspective view of mechanism for imparting movements to the slitting knife;

Figures 23, 24:
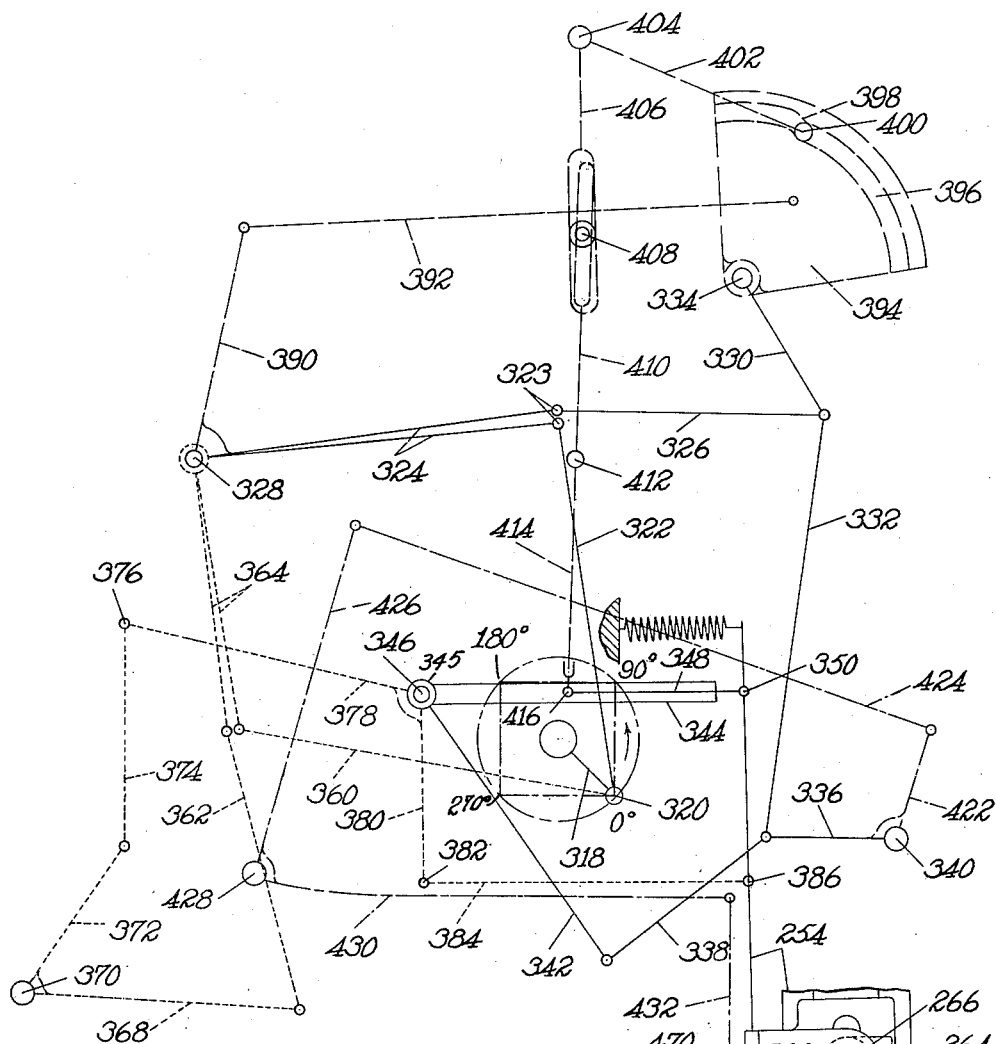
Fig. 23 is a diagrammatic view of the mechanism for operating the feed foot and slitting knife.
Fig. 24 is a diagrammatic view of the path of the feed foot greatly enlarged.

Referring to Figs. 4 and 5, the machine has a base 20 resting on the floor to which is attached at 22 the lower portion 24 of a column 26. In the top portion of the column (Fig. 6) is a vertical bore to receive a neck 28 on the head 30 which carries the operating instrumentalities of the machine. The neck 28 is slidable vertically in the column 26 to permit adjustment of the head to accommodate operators of different heights and to enable the operator to run the machine either in a sitting or standing position. The neck 28 is held in position by a split clamp 32.

On the base 20 is a housing 34 (Fig. 4) for an electric motor 36 having on its shaft 38 a pulley 39 which has two V-belt grooves 40, 42 (Fig. 5). The groove 40 is connected by a V-belt 44 to a pulley 46 on a shaft 48 journaled in a casing and furnishing power to a cut-off knife operating mechanism to be described.

The groove 42 of the pulley 39 (Fig. 5) is connected by a V-belt 52 to one groove 54 of a pulley 56 which has another groove 57 connected by a V-belt 58 to a pulley 60 (Fig. 6) loose on a main shaft 62 journaled in a bracket 64 secured to the machine head 30. On the inner end of the shaft 62 is a ball bearing 66 secured to the bracket 64 by a ring 68 held by screws 70 and its outer end is journaled in a shouldered sleeve 72 which is splined at 73 to a cap 74 held by screws 76 to the bracket 64.

It is desirable to provide a construction whereby the head 30 may be adjusted up or down without changing the length of the belts 52, 58. Accordingly, the pulley 56 is mounted for rotation on a stub shaft 80 carried by a horizontal slide 82 mounted in a block 84 (Fig. 4) having a rib 86 arranged to slide in a groove 88 formed in a vertical face of a strut 90, the strut forming part of the base 24. The strut 90 is provided with a series of threaded holes 92. Screws 94, 95 pass through slots 96 in the block 84 and are threaded into the holes 92. The slide 82 is held by two screws 100 passing through slots in the slide 82 and threaded into the block 84.

Supposing the head is moved down, thus loosening the belt 58, the pulley 56 must now be moved down to restore tension on the belt. The screw 94 is removed and inserted in the next lower hole 92 but not tightened. The screw 95 is loosened and the block moved down, guided by the rib 86. If this movement of the block 84 is sufficient to provide proper tension on the belt 58, the screws 94, 95 are tightened but, if not, the operation is repeated by putting the screws 94, 95 in the next lower holes, one screw being kept tight enough to control movement of the block. This downward movement of the pulleys 54, 56 will loosen somewhat the belt 52. The screws 100 may then be loosened and the slide 82 moved horizontally to put proper tension on the belt 52, the screws being then tightened. A reversal of the process is employed when the head is moved up.

The driven pulley 60 (Fig. 6) is connected to and disconnected from the shaft 62 by a multiple-disk clutch of known type. A series of disks 104 (Fig. 18) is secured to a hub portion 106 of the pulley 60 to rotate therewith and an alternate series of disks 108 is connected to the shaft 62. A sleeve 110 splined to the shaft is movable longitudinally thereon, and to vary its effective length a knurled collar 112 is threaded on one end of the sleeve and has a reduced portion 114 to press upon the disks 104, 108. At the other end of the sleeve is a similar collar 112 for engaging two series of disks similar to 104, 108, one series rotating with the shaft and the other series being secured to the sleeve 72 which, as above stated, is splined at 73 to the cap 74. When the sleeve 110 is moved to the left, the disks 104, 108 are pressed together and the pulley 60 drives the shaft 62. When the sleeve is moved to the right, the right-hand disks are pressed together and the shaft is stopped.

Pinned on the shaft 62 (Figs. 6 and 7) is a cam 118 and also fast on the shaft is a hand wheel 120. The clutch is controlled by a treadle 122 (Fig. 5) fulcrumed on a shaft 124 and connected at 126 to a treadle rod 128 which is urged upward by a compression spring 130 on the rod between the base 20 and a collar 132 on the rod. The rod is made adjustable as to length by an extension 133 (Fig. 6) to permit raising and lowering of the head, the extension having at each end an ear 135 provided with a setscrew. The rod 128 is secured in the lower ear 135 of the extension and the lower end of a rod 129 in the upper ear of the extension. The upper end of the rod 129 (Fig. 7) is pivoted at 134 to an arm 136 of an angle lever fulcrumed at 138 on the bracket 64 and having a longer arm 140 on which is pivoted at 142 a block 145 arranged to move heightwise between projections 144 on a sliding yoke 146. The yoke is splined at 148 to a horizontal shaft 150 the ends of which have bearings in the bracket 64. Extending upward from the yoke 146 is an arm 152 carrying a roll 154 which engages at times the cam 118. On the shaft 150 is secured by a setscrew 155 a depending arm 156 which is connected by a link 158, having therein a turn buckle 159, to a lower arm 160 of a lever fulcrumed at 162 (Fig. 6) on the bracket 64. An upper arm 164 is in the form of a yoke to the arms of which are pivoted at 166 rolls which ride in a peripheral groove 170 in the sleeve 110. The turn buckle 159 in the link 158 is so adjusted that when the high part 171 of the cam 118 engages the roll 154 the lever 152, 156 will pull on the link 158 and, through the lever 160, 164, move the sleeve to the right, thus applying pressure to the right-hand series of disks 104, 108 and stopping the machine. To start the machine, the treadle 122 is depressed to pull on the rod 128 (Fig. 5) which turns the lever 136, 140 (Fig. 7) counterclockwise, causing the yoke 146 to slide to the left on the shaft 150 and the roll 154 to move off the rise 171 of the cam 118, thus releasing pressure on the right-hand series of disks 104, 108. To apply pressure to the left-hand series of disks and cause the shaft 62 to be driven, the treadle rod 129 carries near its upper end a roll or stud 172 (Fig. 7) which is located between two blocks 174, 176 adjustably held by screws 178 to a horizontal arm 180 (Fig. 6) of an angle lever fulcrumed at 182 on the bracket 64 and having a vertical arm 184 which engages a roll 186 on the depending arm 156. Further pressure of the treadle acts through the lever 180, 184 to push the link 158 in a direction to move the sleeve 110 to the left, thus pressing on the left-hand series of disks and causing the shaft 62 to be driven.

When the treadle 122 is released, the treadle spring 130 raises the rod 128, moving the arm 140 toward the right (Fig. 7) and moving the roll 154 on the arm 152 into the path of the cam 118 the rise 171 of which operates the lever 152, 156 to pull on the link 158 and apply pressure to the right-hand series of disks to stop the machine in that portion of its cycle when a feed foot is remote from a cut-off knife.

The insole I is supported on a circular table 190 (Fig. 9) mounted to rotate freely on a central stud 192 seated in the top of a table support 194 and supported by ball bearings 196 between the table and the top of the support 194 which is arranged to move up and down in a bearing sleeve 198 formed in a bracket 200 fixed to the head 30. The table support 194 is hollow and contains a compression spring 202 bearing at its upper end against the table support and at its lower end on a flanged sleeve 204 the lower side of which is recessed to receive the upper end of a screw 206 threaded through an arm 208 on a bracket 210 secured at 212 to the sleeve 198. The screw 206 has a thumb head 214 by which it may be turned to vary the initial tension of the spring 202 and hence the force by which the table is held up against the operating instrumentalities (to be described). Upward movement of the table in response to the spring 202 is adjustably limited by a screw 216 (Fig. 2) threaded through a collar 218 secured by means of screws 220 on the lower end of the table support 194, the upper end of the screw 216 engaging the fixed bearing sleeve 198 when no insole is in the machine.

A treadle 222 (Fig. 5) is fulcrumed on the shaft 124 and is connected at 224 to a rod 225. The upper end of another rod 226 is connected at 227 to a lever 228 (Fig. 2). The lever is pivoted at 230 to the bracket 210 and engages between its ends a roll 232 (Fig. 9) on one of the screws 220 which hold the collar 218 to the table support 194. Each of the adjacent ends of the treadle rods 225, 226 (Fig. 1) extends through an ear 236 in one end of an extension 238 where it is held by a setscrew 240. The treadle rod comprising the parts 225, 226, 238 is thus made adjustable to permit the head 30 to be adjusted up or down. A compression spring 242 (Fig. 5) on the rod 225 rests on a ledge 244 of the base 24 and at its upper end engages the extension 238, thus sustaining the treadle and treadle rod. Depression of the table 190 by the treadle 222 permits the insole to be placed on the table and located by engagement with an edge gage 234 (Fig. 13).

The edge gage 234 and the mechanism for shifting it by a handle 246 to vary the position of the insole with respect to the strip-applying mechanism are all carried by a bracket 248 (Fig. 2) secured to the table support 194 so that when the table 190 is moved up or down the edge gage 234 goes with it. The edge gage and the mechanism for shifting it are more fully described in the prior Patent No. 2,326,119 above referred to.

A reel 249 carrying an indefinite length of a ribbed strip S is supported for rotation on a bracket 250 (Fig. 2) fixed to the head 30. The end of the strip is passed through a guide loop 252 carried by the bracket 250 and through a feed foot, best shown in Figs. 10, 11 and 12, which is mounted by screws 253 (Fig. 12) on a lever 254 (Fig. 2).

The feed foot comprises a body portion 260 having a pair of ears 262 spaced apart to receive between them a pair of feed pawls 264, 265 pivoted by a pin 266 to the ears 262. Between the pawls is a space to permit passage of the rib R of the ribbed strip S between them, and the body portion is notched at 267 (Fig. 12) to permit passage of the rib R of the strip. The strip rests on a ledge 268 (Fig. 10) projecting outwardly from a member 270 secured to the rear face of the body portion 260 (Fig. 12). One pawl engages the inner flange F' (Fig. 11) of the strip and the other pawl engages the outer flange F, and each pawl is urged into contact with its flange by a spring 272 one end of which is seated in a hole in the pawl and the other end in a hole in the body portion 260. Each pawl has a projection 274 downward pressure on which will release the pawl from the strip by compressing the spring 272. When the feed foot is moved to the right the pawls slip on the flanges of the strip and, when the feed is moved to the left, the pawls dig in and feed the strip.

In the body portion 260 is a vertical slideway 276 (Fig. 12) in which is mounted a slide 278 urged downward by a compression spring 280 engaging the upper end of the slide and held in place by a plate 282 secured by screws 284 to the upper end of the body portion 260. The slide 278 has two downwardly directed legs 283, 285, one longer than the other. The short leg 283 is notched at 286 near its lower end (Fig. 11) to form a sharp edge or dog 288 which, when permitted to do so, is urged by the spring 280 against the inner flange of the strip to prevent leftwise movement (Fig. 10) of the strip with respect to the foot, the strip being supported under the dog by the thin end portion of the ledge 268. The longer leg 285 of the slide 278 is normally in engagement with the insole which is held up by the table spring 202 (Fig. 9) which is stronger than the spring 280 so that the dog 288 is out of contact with the strip (Fig. 11). When the table is lowered to remove the insole (Fig. 10), the dog 288 engages the strip and prevents the strip from being drawn through the guide foot. The slide 278 is held in place and its required movement permitted by a screw 290 (Fig. 12) passing into a vertical slot 292 in the slide.

Secured to the body portion 260 (Fig. 11) is a presser plate 300 which has a rib-shaped notch to receive the rib R of the strip and at each side of the rib has toothed surfaces 304 to engage the strip, one engaging its outer and the other its inner flange. Thus, as the four-motion feed foot moves to the right, the feed pawls 264, 265 slip over the strip. As the foot moves down, the surfaces 304 press both flanges of the strip against the insole I, causing it to adhere thereto. The foot then moves to the left, feeding the strip and insole, that is, the work. The foot then rises and moves toward the right again.

The mechanism by which the feed foot is given its movement is mostly enclosed within the head 30, is similar to that fully described in Patent No. 2,573,683 above referred to, and is shown in Figs. 19, 20, 21, and in the diagrammatic view of Fig. 23. The path of movement of the foot is substantially a rectangle, as represented greatly enlarged in the diagram of Fig. 24. Since the work is sustained by the yielding table 190, the movements of the feed foot are made positive, and, since the movement of the foot during the feed of the work is in a substantially straight horizontal line, the tension of the table spring 202 does not vary appreciably during the feed movement.

The mechanism for imparting up and down movements to the feed foot is shown in full lines in Fig. 23. This diagram shows the relative dimensions of all the links, arms and levers and the locations of their centers as they lie in the machine as seen from the side shown in Fig. 2, except that coinciding arms in two instances are shown slightly divergent for the sake of clearness. These pairs of arms, for the purpose of explanation, may each be regarded as one and hence are designated by the same numeral.

On the inner end of the shaft 62 (Figs. 6 and 19) is a balanced crank 318, a crank pin 320 of which is linked by a vertical connecting rod 322 to an arm 324 on a rockshaft 328. Another similar arm 324 on the rockshaft carries the joint 323 of a toggle 324, 326 having a fixed pivot on the shaft 328. As the crank pin 320 moves through the first quadrant from 0° to 90° (Fig. 23) it will break upward the toggle 324, 326 and cause a second toggle 330, 332 having a fixed pivot at 334 and a third toggle 336, 338 having a fixed pivot at 340 to be straightened, causing an angle lever 342, 344 to turn clockwise with a sleeve 345 loosely mounted on a shaft 346 in fixed bearings. The arm 344 fixed to the sleeve 345 has a slide 348 in it one end of which is pivoted at 350 to the lever 254 which carries the feed foot. Clockwise movement of the arm 344 will therefore move the feed foot from A to B of the diagram (Fig. 24). Reverse movement will, of course, occur when the crank pin 320 moves down in the third quadrant from 180° to 270°.

As the crank pin 320 moves through the second quadrant from 90° to 180°, its movement is nearly horizontal, and a nearly horizontal connecting rod 360 (Fig. 20) will break a toggle 362, 364, connected between the fixed shaft 328 and an arm 366 of a bell-crank having a fixed fulcrum at 370. Another arm 372 of the bell-crank forms a toggle 372, 374 the upper link of which is pivoted at 376 to an arm 378 secured to the shaft 346. An arm 380 on the shaft 346 is connected at 382 to a link 384 the other end of which is connected to the lever 254 at 386. Movement of the crank pin from 90° to 180° (Fig. 23) will break the toggle 362, 364 and straighten the toggle 372, 374, causing clockwise movement of the arms 378, 380 and, through the link 384, will move the lever 254 to the left, carrying the feed foot along the line B—C of the diagram (Fig. 24) to feed the work. The slight heightwise movement of the crank pin in this quadrant will be nullified by a slight movement of the toggles 330, 332 and 336, 338 which are substantially straight.

During movement of the crank pin from 180° to 270° the foot will rise from C to D (Fig. 24) and its horizontal movement will be nullified by a slight movement of the joint of the toggle 372, 374 while it is substantially straight.

As the crank moves from 270° to 0° the foot will move from D to A, its vertical movement being nullified by a slight movement of the toggle 324, 326 while it is substantially straight. This slight vertical movement, however, is used to move the foot from A to E and back to produce a slight overfeed of the strip, that is, a feeding of the strip more than the insole is fed. The rockshaft 328 carrying the arms 324 has fixed thereto an arm 390 (Fig. 21) which, as the crank pin 320 drops in its movement from 270° to 0°, moves clockwise. This movement is imparted by a link 392 connected to an arm 393 on the rockshaft 334 to a cam 394 fixed to the shaft 334 and having a cam path 396 in which is a rise 398. In the cam path is a roll 400 on an arm 402 of an angle lever having a fixed fulcrum at 404 and having another arm 406 adjustably pivoted at 408 to the upper arm 410 of a lever fulcrumed at 412 and having a lower arm 414 connected at 416 to the slide 348. This connection is such that the arm 414 will impart horizontal movements to the slide but will permit slight vertical movement of the arm 344 carrying the slide 348 with respect to the lever arm 414 during the up-and-down movement of the feed foot. The rise 398 of the cam 394 causes slight counterclockwise movement of the arms 402, 406. The arm 406 turns the lever 410, 414 clockwise, causing movement of the slide 348 to the left but, since the pivot 386 of the lever 254 is then stationary, the feed foot moves to the right and immediately back to effect the overfeed of the strip, that is, the movement from A to E and E to A in Fig. 24.

When the toggle 324, 326 is broken as the pin 320 moves from 0° to 90°, causing counterclockwise movement of the cam 394, the roll 400 rides in a concentric part of the cam path 396 and no movement is imparted to the arm 402. The arms 406, 410 are slotted and the pivot 408 is adjustable up and down in the slots to vary the amount of overfeed A—E (Fig. 24).

The mechanism shown in dot and long dash lines in Fig. 23 and shown in Fig. 22 is utilized in accordance with our invention to operate a knife 420 to slit the outer flange F of the strip S. An arm 422 forming part of the link 336 of the toggle 336, 338 is connected by a link 424 to an arm 426 fixed to a shaft 428 having an arm 430 pivoted to an upright connecting rod 432 the lower end of which (Figs. 2, 14 and 22) is pivoted to an arm 434 mounted to oscillate on a shaft 436 mounted in bearings in a bracket (Fig. 14) secured to the head 30. The arm 434 has secured to it by dowel pins 440 (Fig. 13) and a screw 442 another arm 444 to which is pivoted at 446 a knife-carrying lever 448, 450. The lower arm 448 has secured to it by dowel pins 452 and a screw 454 the knife 420 which is sharpened at its lower end and is normally located over the outer flange F of the strip S so that vertical movement of the knife by the mechanism described will slit the outer flange in timed relation to the movements of the feed foot, the knife moving down in the cutting stroke while the feed foot is moving up.

Since the slitting of the flange is desired only while rounding sharply curved portions of the insole edge and is not desired along the shank portions, means is provided for rendering the knife 420 inoperative when the edge gage 234 is shifted for applying the strip to the shank portion of the insole. The upper arm 450 (Fig. 13) of the lever carrying the knife 420 is connected by a link 470 to the upper arm of a lever 472, 474 fulcrumed on the shaft 436. The lower arm 474 carries a roll 476 which is in the path of a projection 478 secured at 480 to the edge gage 234 and shiftable therewith toward and away from the insole. When the lever 472, 474 is moved counterclockwise by movement of the gage 234 away from the table 190, as it is when applying the strip to the shank portion of the insole, the link 470 pushes the arm 450 to the left and the arm 448 carrying the knife 420 to the right to the dotted line position of Fig. 13 to render it inoperative while its oscillating movement continues.

To locate the knife accurately with respect to the rib R, the link 470 carries a stop 482 (Fig. 14) which is secured to the link by screws 484 which pass through horizontal slots in the link and are threaded into the stop 482. When the knife 420 is in operative position the stop 482 contacts with a stop plate 486 secured to the bracket 438. A tension spring 488 is connected between a pin 490 on the link 470 and an ear on the plate 486 to hold the stop 482 normally against the plate 486 with the knife 420 in position to cut the outer flange F up to the rib R of the strip.

Since the knife 420 is positively actuated, it is desirable to provide means for varying the limit of the knife stroke so as to cut through the flange without cutting into the insole. Hence the arm 430 is made adjustable with respect to the shaft 428. The shaft has an integral collar 456 (Fig. 3) and a reduced portion 458 that extends through a hole in the arm 430. Screws 460 with conical ends are threaded into the arm 430, their conical ends entering holes 462 in the collar 456, each conical end bearing on one side of its hole. For example, each conical end may bear on the lower side of its hole. Then, by turning one screw 460 out and the other in, the free end of the arm 430 will be moved up or down about the axis of the shaft 428. The screws 460 are secured in adjusted position by set nuts 464 and, after adjustment, the arm is securely fastened to the collar 456 by screws 466 passing through slots in the arm 430 and threaded into the collar 456.

The strip is usually applied to the insole by starting at one end of the breast line (Figs. 16 and 22), applying the strip along the shank at a considerable distance from the edge of the insole, then applying it along one side of the forepart at a less distance, around the toe at an intermediate distance, then along the second side of the forepart at the less distance, and then along the second side of the shank at a greater distance from the edge, ending at the other end of the breast line where the strip is severed by a knife 500 (Fig. 9) arranged to move horizontally across the ribbed strip with the lower part of its cutting edge moving in the plane of the upper face of the insole.

The feed foot, when at the limit of its feed movement, comes close to a fixed but adjustable stop 502 (Figs. 9 and 11), which engages the outer flange F of the strip as the feed foot rises and the table spring 202 reacts. The stop also engages the outer face of the rib R and has a hook 504 extending over the top of the rib. The stop 502 is fixed to an arm 506 (Fig. 9) on a shaft 508 in the head 30. Threaded into the upper side of the arm 506 is a screw 510 the head of which engages a lug 512 on the head, and threaded into the lower side of the arm is a similar screw 514 engaging the bracket 200. By adjusting these screws, which are locked by set nuts, the vertical position of the stop 502 may be varied and fixed. To the rear face of the arm 506 is secured, by screws 516, 518 passing through vertical slots in the arm, a member 520 (Fig. 22) in which a slide 521 for the knife 500 is mounted for horizontal movement. To adjust the member 520 the screws 516, 518 are loosened and an eccentric stud 522 having a screw-driver slot and set nut 524 is turned to adjust the member 520 relatively to the arm 506, the screws 516, 518 being then tightened to hold the adjustment. This, of course, varies the position of the knife path relatively to the stop 502 which, in turn, determines the position of the insole. The knife can therefore be adjusted so that it can cut the strip without cutting into the insole.

The rear end of the knife slide 521 (Fig. 9) is connected by a turn buckle link 530 to one arm 532 of an angle lever fulcrumed at 534 on the head 30, the other arm 536 being jointed to a rod 538. The arm 532 is made in two parts held together by a bolt 533, one of the parts being slotted to permit lengthwise adjustment of the arm. The lower end of the rod 538 enters a tube 539 which (Fig. 5) is pivoted to an arm 540 on a rockshaft 542, the upper end of the tube being split and provided with ears in which are screws 541 for clamping the rod 538 and the tube 539 together after lengthwise adjustment. Another arm 544 on the rockshaft 542 is linked by a connecting rod 546 to a crank pin 550 which at times is driven by a worm 552 on the shaft 48 driven by the belt 44 from the motor 36. Still another arm 555 on the rockshaft 542 is slotted to receive a pin 557 on the plunger of a counter 559 to record the number of operations of the knife clutch.

As shown in Fig. 8, the crank pin 550 is eccentrically fixed to a member 554 which has a cam path 556 formed therein. The member 554 is bored horizontally and bushed to receive the end portion of a shaft 558 on which is pinned a worm wheel 560 meshing with the worm 552 formed on the shaft 48. The adjacent faces of the worm wheel and the member 554 are formed with teeth 562 which at times are allowed to engage to cause the worm wheel 560 driven by the motor to turn the crank pin 550. The left-hand end of the shaft 558 is journaled in a cap 564 secured to the casing 50 which contains the parts being described. The member 554 is journaled in a cap 568 secured to the casing 50 and is movable lengthwise of the shaft 558. Engaging the cam portion of the member 554 is a washer 570 which is urged to the left by at least three spring plungers 572, the plungers being mounted in the cap 568 and backed by compression springs 574.

A vertically movable pin 576 (Fig. 8) has a reduced lower end lying normally in the cam path 556, an inclined portion 577 of the cam acting on the pin when the cam is being rotated to push the cam member 554 to the right against the spring plungers 572 and disengage the teeth 562. Conversely, when the pin 576 is lifted out of the cam path 556, the spring plungers 572 push the cam member to the left, causing engagement of the teeth 562 and hence rotation of the crank pin 550 and operation of the knife 500 to sever the strip through the connections described. The pin 576 has a grooved head 578 resting on the casing 50 in the groove of which is a pin 580 (Fig. 8) carried by one branch 582 of a double arm, the other arm 584 being connected integrally to the arm 582 by a web 586. The double arm is fulcrumed by a pin 588 to a lug 590 on the casing 50 (Fig. 5). The arm 584 is connected by a pin 592 to a rod 594 which at its upper end (Fig. 6) is pivoted at 596 to an arm 598 fixed to a rockshaft 600 journaled in a bracket 602 fixed to the column, the shaft 600 extending inside the column to receive the arm 598. To the shaft outside the column is loosely pivoted an arm 604 and fixed to the shaft 600 by a clamp 606 is an arm 608 having thereon an upstanding lug 610. A vertical rod 612 passes through a hole in the arm 604 and is clamped thereon for lengthwise adjustment by a screw 614, the lower end of the rod carrying a knee pad 616. Mounted in ears 618, 620 on the arm 604 is a spring plunger 622, the portion thereof in the ear 620 being larger than that in the ear 618. On the plunger 622 between the larger portion and the ear 618 is a compression spring 624 the action of which is limited by nut 626 on the plunger. When the knee pad 616 is moved to the left, the plunger engages the lug 610 and tends to turn the lever 598, 608 clockwise and lift the pins 576 to set the knife clutch.

Safety mechanism is provided to prevent movement of the arm 598 to set the clutch except under certain conditions. For this purpose the arm 608 is pivoted at 628 (Fig. 6) to a rod 630 made adjustable for length in the same manner as the rod 225, 226. The upper end of this rod is pivoted at 632 to an arm 634 of an angle lever fulcrumed at 162 and having another arm 636 carrying a pin 638 which enters a groove in a head 640 on a rod 642 arranged to slide longitudinally in the bracket 64. A reduced end of the rod 642 is opposite a circular groove 644 formed in the web of the hand wheel 120, the circular groove 644 extending only through that portion of the cycle of the shaft 62 in which the feed foot is most remote from the knife 500. In the position shown in Fig. 6, the knee pad 616 can be pushed to the left, causing the plunger 622 to press on the lug 610 and turn the lever 598, 608 clockwise, the arm 598 lifting the rod 594 to trip the clutch of the cut-off knife and the arm 608 pulling on the rod 630, causing the rod 642 to enter the groove 644 in the web of the hand wheel 120. Should the hand wheel have stopped in such a position that the rod 642 could not enter the groove, it would engage a portion of the web of the hand wheel of full thickness but could not move appreciably. Under these conditions, the plate 380 of the feed foot would be in the path of the knife, as indicated by the dash line position of the plate in Fig. 11. Therefore the rod 594 could not be lifted to set the clutch and energy applied to the knee pad would be absorbed by the spring 624 without putting undue strain on the feeler pin and its connections.

To prevent movement of the feeler rod 642 when the shaft 62 is rotating, the rod has a vertical slot therein which is engaged by a pin 645 on an arm 646 which is pivoted at 648 (Fig. 18) to the bracket 64 and carries a horizontal lug 650. The pin 645 passes through a horizontal slot in the casing 64 to engage the vertical slot in the feeler rod 642. On the lever 164 which is moved to the left by the treadle 122 to set the clutch on the shaft 62 is an L-shaped plate 652 part of which lies just above the lug 650. When the feeler rod is moved into the groove 644 to cause operation of the cut-off knife, the arm 646 is turned counterclockwise and the lug 650 lies in the path of the plate 652 on the lever so that the treadle cannot be depressed to operate the shaft 62. Furthermore, when the treadle has been depressed and the shaft 62 is operating, the plate 652 lies over the lug 650 so that the rod 642 cannot be moved and hence movement of the knee pad is ineffective to set the knife clutch. Thus, neither clutch can be operated when the other is set or working and their operation is mutually exclusive.

The mechanism shown in Fig. 15 not only accomplishes the mutually exclusive action of the clutches but also insures that the indicator 559 be operated only once for each sole even if the cut-off knife is operated more than once to sever the strip. The indicator or counter 559 is operated to record the number of operations of the knife 500 by moving a plunger 662. The plunger is notched at 664 to receive a projection 666 on a slide 668 mounted to move endwise in a boss 670 on the casing 50. The right-hand end of the slide is slotted and a roll 672 is mounted in the slot on a pin 674. An angle lever 676, 678 fulcrumed at 680 on the casing 50 and in an extension 682 of the cap 568 has its arm 676 extending up through the slot in the slide in the path of the roll 672 and its arm 678 pivoted at 684 to the treadle rod 128. The arm 555 is arranged in this construction to engage a roll 686 mounted on the slide. When this arm moves clockwise during operation of the knife 500, the slide 668 is moved to the left and remains there even if the knife is operated a number of times. This movement of the slide brings the roll 672 into proximity to the arm 676 and, when the treadle 122 is operated, the angle lever 676, 678 is moved clockwise and restores the slide to its initial position.

The arm 584 connected to the rod 594 by the pin 592 has the pin extended to carry also a link 688 which is connected at 690 to a lever 692, 694 fulcrumed at 696 on the casing 50. The arm 694 has two surfaces 698, 700 formed thereon. When the rod 594 is raised to cause operation of the knife clutch, the surface 698 lies against and parallel to the upper end of the arm 676 and thus prevents operation of the rod 128 by depression of the treadle. When the treadle is depressed, the end of the arm 676 moves close to the surface 700 which is concentric with the pivot 680 of the arm and hence the rod 594 cannot be raised to set the knife clutch. Thus, mutually exclusive operation of the clutches is insured.

Having thus described our invention, what we claim as new and desire to secure by Letters Patent of the United States is:

1. In a machine for applying ribbed strips to insoles to form sewing ribs thereon, the combination of a yielding table for supporting an insole, a four-motion feed foot above the table through which the strip is guided, pawls in the feed foot for feeding the strip relatively to the insole, and a plate on the feed foot for pressing the margins of the strip upon the insole and for feeding the insole.

2. In a machine for applying ribbed strips to insoles, the combination of a table for supporting an insole, a four-motion feed foot above the table having a guide for the strip, having feed pawls pivoted thereto for advancing the strip and having surfaces thereon for pressing the margins of the strip on each side of the rib against the insole, and means for operating the feed foot to do its work.

3. In a machine for applying a strip to insoles, the combination of a depressible table for supporting an insole, a four-motion feed foot comprising a guide for the strip, feed pawls for advancing the strip, means on the foot for pressing the strip on the insole while it is being fed, said feed foot being mounted above the table, and a dog on the feed foot rendered operative by lowering the table for preventing movement of the strip through the guide.

4. In a strip-laying machine, a frame, a table mounted on the frame to support an insole, a feed foot mounted on the frame above the table, mechanism carried by the frame for imparting to the feed foot orbital movement independently of the table, part of said movement being parallel to the table, means on the feed foot for guiding the strip, means on the feed foot for feeding the strip prior to its attachment to the insole, and surfaces on the feed foot for pressing the whole lateral extent of the strip except the rib upon the insole to cause it to adhere thereto.

5. In a machine for applying ribbed strips to insoles, a yielding table for supporting an insole, a four-motion feed foot above the table, said feed foot having thereon a guide for the strip, having therein a spring-pressed pawl for feeding the strip and having thereon pressing surfaces extending in the direction of feed distances substantially equal to the feed movement, said surfaces engaging the strip on opposite sides of the rib, and means for operating the feed foot to cause it not only to press the strip upon the insole but also to feed the strip and insole.

6. In a strip-laying machine, a depressible support for the work, a four-motion feed foot having therein a guide passage for the strip, feed pawls for advancing the strip, a toothed member for pressing the strip on the work and feeding the work, a vertically movable dog in the feed foot, and a spring for depressing the dog to hold it in engagement with the strip, said dog having a leg to be engaged by the work on the support to hold the dog out of contact with the strip when the support for the work is in raised position.

7. In a strip-laying machine, a depressible support for the work, a four-motion feed foot having therein a guide passage for the strip and means thereon for laying the strip and feeding the work, a knife movable across the strip adjacent to said feed foot to sever the part of the strip adjacent to the feed foot, and a spring-pressed dog sustained by the work support acting when the work support is lowered after operation of the knife to hold the strip in the guide and enable the insole to be separated from the portion adhering to the work.

8. In a machine for applying ribbed strips having inner and outer flanges to insoles, a four-motion feed foot, means on the fed foot for pressing both flanges of the strip upon the insole and feeding the insole, a slitting knife, means to operate the slitting knife in timed relation to the feed foot to slit a flange of the strip, and operator-controlled means for moving the slitting knife transversely of the rib out of operative position.

9. In a machine for applying ribbed strips having inner and outer flanges to insoles, a four-motion feed foot, means on the feed foot for pressing both flanges of the strip upon the insole and feeding the insole, a slitting knife, means for continuously reciprocating the slitting knife, an edge gage, and means operated by movement of the edge gage for moving the knife out of operative position while its reciprocation continues.

10. In a machine for applying ribbed strips having inner and outer flanges to insoles, a four-motion feed foot, means on the feed foot for pressing both flanges of the strip upon the insole and feeding the insole, an edge gage for varying the location of the ribbed strip with respect to the insole edge, a slitting knife operating to slash the outer flange of the strip, and means operated by setting the gage to apply the strip farther from the edge of the insole for rendering the slitting knife inoperative.

11. In a machine for applying flanged ribbed strips to insoles to form sewing ribs thereon, the combination of a support for an insole, a four-motion feed foot engaging the flange on each side of the rib and having a passage for the ribbed strip, a knife having a cutting edge parallel to one of the flanges of the strip, and means for reciprocating the knife in a direction normal to the plane of the flange in timed relation to the movement of the feed foot.

12. In a machine for applying to an insole a ribbed strip having a flange at each side of the rib, the combination of a support for the insole, a four-motion feed foot engaging the flange at each side of the rib, said foot having a passage for the strip, a knife having a cutting edge parallel to one flange of the strip, and means for oscillating the knife heightwise to slit the flange after the foot has pressed it upon the insole.

13. In a machine for applying double flanged ribbed strips to insoles to form sewing ribs thereon, the combination of yielding means for supporting an insole, a feed foot having means to press both flanges of the strip upon the insole, said feed foot having a passage for the strip, pawls on the feed foot for advancing the strip relatively to the insole, and means for positively operating the feed foot bodily in a closed path to press both flanges of the strip on the insole and to feed the insole.

14. In a machine for applying double flanged ribbed strips to insoles, a head frame, a table on the head frame, means for yieldingly supporting the table, a fixed stop on the head frame engaging the outer flange of the strip after the strip is applied to limit upward movement of the table, a feed foot mounted on the head frame having a passage for the strip, having pawls to feed the strip and having means to press the flanges of the strip on each side of the rib upon the insole, and means for imparting a positive four-motion movement to the feed foot whereby the foot depresses the table to free the work from the stop, then feeds the work and then releases the table to cause the work to be pressed against the stop by the table.

15. In a machine for applying strips to shoe parts, the combination of strip-applying means, a clutch for operating the same, a cut-off knife for severing the strip, a clutch for operating the knife, and alternatively operated stops for rendering the operation of the clutches mutually exclusive.

16. In a machine for applying strips to shoe parts, the combination of strip-applying means, a first clutch for operating the applying means, a knife for severing the strip, a second clutch for operating the knife, a stop for preventing the setting of each clutch, connections operated by the first clutch to set one stop to prevent operation of the second clutch, and connections operated by the second clutch to set the other stop to prevent operation of the first clutch.

17. In a machine for applying strips to insoles, the combination of a support for the insole, a strip-applying foot, a shaft, means for imparting a four-motion movement to the foot from said shaft, power-driven means, a first clutch between said shaft and said power-driven means, a treadle for operating the clutch to connect the shaft to the power-driven means, a knife operable to sever the strip after its application to the insole at a point near the feed foot, power-driven means for operating the knife, a second clutch between said power-driven means and the knife, a knee lever for operating the second clutch, a stop operated by the treadle to prevent effective operation of the knee lever, and a stop operated by the knee lever to prevent operation of the treadle.

18. In a machine for applying strips to insoles, a main shaft, applying means operated thereby, a clutch for causing the shaft to be driven, a cut-off knife for the strip, a clutch for controlling operation of the knife, a member on the main shaft having a groove therein representing that portion of the cycle of the main shaft in which it is safe to operate the knife, and a feeler rod arranged to enter the groove when the knife clutch is operated and acting to prevent setting of the knife clutch if the main shaft has stopped in such a position that the feeler rod cannot enter the groove.

19. In a machine for applying strips to insoles, a main shaft, friction disks pressure on which causes the shaft to be driven, other friction disks pressure on which causes the shaft to stop, automatic means for applying pressure to said last-named disks to stop the shaft, a cut-off knife, a clutch for operating the knife, means for setting the clutch, and means for preventing setting of the clutch unless the shaft has stopped in a predetermined portion of its cycle.

20. In a machine for applying strips to insoles, a cut-off knife, a four-motion feed foot operating into and out of the path of the knife, a shaft for operating the feed foot, friction starting and stopping disks for the shaft, a treadle depression of which applies pressure to the starting disks to cause rotation of the shaft, automatic means for applying pressure to the stopping disks when the treadle is released, a grooved member on the shaft, the groove representing the portion of the cycle when the feed foot is remote from the knife, a feeler rod arranged to enter said groove, a clutch through which the cut-off knife is operated, and clutch-setting means operation of which depends on entrance of the feeler rod into the groove.

21. In a machine for applying strips to insoles, a cut-off knife, a four-motion feed foot operating into and out of the path of the knife, a shaft for operating the feed foot, friction starting and stopping disks for the shaft, a treadle depression of which applies pressure to the starting disks to rotate the shaft, automatic means for applying pressure to the stopping disks when the treadle is released, a grooved member on the shaft, the groove representing the portion of the cycle when the feed foot is remote from the knife, a feeler rod arranged to enter said groove, a clutch through which the cut-off knife is operated, clutch-setting means operation of which depends on entrance of the feeler rod into the groove, and a stop operated by the feeler rod to prevent depression of the treadle when the feeler rod enters the groove.

22. In a machine for applying strips to insoles, a cut-off knife, a four-motion feed foot operating into and out of the path of the knife, a shaft for operating the feed foot, friction starting and stopping disks for the shaft, a treadle depression of which applies pressure to the starting disks to rotate the shaft, automatic means for applying pressure to the stopping disks when the treadle is released, a grooved member on the shaft, the groove representing the portion of the cycle when the feed foot is remote from the knife, a feeler rod arranged to enter said groove, a clutch through which the cut-off knife is operated, clutch-setting means operation of which depends on entrance of the feeler rod into the groove, and a stop operated by the treadle to prevent movement of the feeler rod when the treadle is depressed.

23. In a machine for applying strips to insoles, a cut-off knife, a four-motion feed foot operating into and out of the path of the knife, a shaft for operating the feed foot, friction starting means for the shaft, friction means for stopping the shaft, a treadle depression of which applies pressure to the starting means to cause the shaft to rotate, automatic means for applying pressure to the stopping means when the treadle is released, a grooved member on the shaft, the groove corresponding to that portion of the cycle when the feed foot is remote from the knife, a feeler rod arranged to enter said groove, a clutch through which the cut-off knife is operated, and clutch-setting means operable only when the feeler rod can enter the groove.

24. In a machine for applying strips to insoles, a cut-off knife, a four-motion feed foot operating into and out of the path of the knife, a shaft for operating the feed foot, friction starting and stopping disks for the shaft, a treadle depression of which applies pressure to the starting disks to cause rotation of the shaft, automatic means for applying pressure to the stopping disks when the treadle is released, a clutch through which the cut-off knife is operated, clutch-setting means, and a stop operated by the clutch-setting means to prevent depression of the treadle when the knife is operating.

25. In a machine for applying strips to insoles, a cut-off knife, a four-motion feed foot operating into and out of the path of the knife, a shaft for operating the feed foot, friction starting and stopping disks for the shaft, a treadle depression of which applies pressure to the starting disks to cause rotation of the shaft, automatic means for applying pressure to the stopping disks when the treadle is released, a clutch through which said cut-off knife is operated, clutch-setting means, and a stop operated thereby to prevent depression of the treadle when the clutch is set.

26. In a machine for applying strips to insoles, the combination of a support for the insole, a strip-applying foot, a shaft, means for imparting a four-motion movement to the foot from said shaft, power-driven means, a first clutch between said shaft and said power-driven means, means for setting the first clutch to connect the shaft to the power-driven means, a knife operable to sever the strip after its application to the insole at a point near the feed foot, power-driven means for operating the knife, a second clutch between said power-driven means and the knife, a knee lever, means for setting the second clutch, and a spring between the lever and said second clutch-setting means.

27. In a machine for applying strips to insoles, the combination of a support for the insole, a strip-applying foot, a shaft, means for imparting a four-motion movement to the foot from said shaft, power-driven means, a first clutch between said shaft and said power-driven means, means for setting the clutch to connect the shaft to the power-driven means, a knife operable to sever the strip after its application to the insole at a point near the feed foot, power-driven means for operating the knife, a second clutch between said power-driven means and the knife, means for setting the second clutch, a counter having a plunger, means operated upon setting of the second clutch to move the plunger in one direction, and means operated upon setting of the first clutch to move the plunger in the other direction.

NORMAN E. MARINER.
LLOYD G. KNOWLES.

REFERENCES CITED

The following references are of record in the file of this patent:

UNITED STATES PATENTS

| Number | Name | Date |
| --- | --- | --- |
| 2,053,572 | Moster | Sept. 8, 1936 |
| 2,138,117 | O'Brien et al. | Nov. 29, 1938 |
| 2,326,119 | Bertrand | Aug. 10, 1943 |
| 2,341,992 | Jarrett | Feb. 15, 1944 |
| 2,383,560 | Paulsen | Aug. 28, 1945 |
| 2,410,004 | Bertrand | Oct. 29, 1946 |
| 2,493,207 | Paulsen | Jan. 3, 1950 |
| 2,494,578 | Paulsen | Jan. 17, 1950 |